2,988,532
COPOLYMER OF AN ETHYLENICALLY UNSATURATED COMPOUND AND MALEIC ANHYDRIDE POLYTHIOETHERGLYCOL REACTION PRODUCT

Günther Nischk, Leverkusen, and Hans Holtschmidt and Karl-Heinz Eisenmann, Koln-Stammheim, Germany, assignors, by direct and mesne assignments, of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Feb. 28, 1956, Ser. No. 568,188
Claims priority, application Germany Feb. 28, 1955
4 Claims. (Cl. 260—45.4)

This invention relates to new copolymers and a process for producing the same. More particularly, the present invention is concerned with copolymers obtained by reacting an hydroxyl polyether with an unsaturated compound containing a group capable of reacting with the hydroxyl groups of the hydroxyl polyether, and subsequently copolymerizing the unsaturated polyether thus obtained with a vinyl compound.

It is known (see German Patent 910,124) to produce copolymers by reacting a condensation or polymerization product containing free terminal hydroxyl groups, which is still soluble, with an unsaturated compound containing a group capable of reacting with the terminal hydroxyl groups of the condensation or polymerization product, and subsequently copolymerizing the unsaturated polymerization or condensation products thus obtained with a polymerizable vinyl compound. As condensation or polymerization products containing terminal hydroxyl groups, there are ordinarily used hydroxyl polyesters obtainable by esterification of saturated dicarboxylic acids with an excess of polyhydric alcohols. However, the copolymers thus produced are not stable to hot water, which causes a marked deterioration of their mechanical properties. On the other hand, polymerization products containing terminal hydroxyl groups are useful as starting materials in the above process only if their molecular weight is not too high since otherwise they form reaction products the solutions of which in vinyl compounds are too viscous to be suitable as cast resins.

It is an object of the present invention to provide copolymers being stable to hot water and other hydrolyzing agents. Another object is to provide copolymers which can be produced from easily obtainable starting materials. A further object is to provide a process for producing these novel copolymers. Still further objects will appear hereinafter.

These objects are attained in accordance with the present invention by reacting a polyether containing terminal hydroxyl groups with an unsaturated compound containing a group capable of reacting with hydroxyl groups, and copolymerizing the unsaturated polyether thus obtained with a polymerizable vinyl compound.

Polyethers containing terminal hydroxyl groups, which are useful in this invention, may be obtained in known manner, for example, by reacting a polyhydric alcohol with an alkylene oxide or by polymerization of a cyclic ether, such as tetrahydrofuran, in the presence of a Friedel-Crafts catalyst. A preferred group of polyethers containing terminal hydroxyl groups is obtained by reacting a polyhydric alcohol with a thioether glycol in a molar ratio within the range of about 1:1 to about 1:1.5, using temperatures ranging from about 100° to about 300° C. and a dehydration catalyst to accelerate the reaction. Due to the S bridges contained in their molecule, these hydroxyl polyethers are hydrophobic and, therefore, particularly suitable for use as starting materials in the process of the invention.

Examples of polyhydric alcohols which may be used in the production of the above polyethers include ethylene glycol, 1,3-butylene glycol, 1,4-butylene glycol, 1,5-amylene glycol, 1,6-hexylene glycol, trimethylol propane, glycerol, hexanetriol, pentaerythritol and mannite. Furthermore, mixed aromatic-aliphatic glycols, such as p-xylylene glycol, dihydroxyethyl hydroquinone, dihydroxyethyl-1,5-dihydroxy-naphthalene and the 4,4'-di-(β-hydroxyethyl)-ether of 4,4'-dihydroxy-diphenyl-dimethyl methane, may also be used in the present process. Diethylene glycol, triethylene glycol and higher homologues thereof are on the other hand less suitable as starting substances, since too many hydrophylic oxygen bridges are introduced by such components into the polyethers being formed.

Examples of thioether glycols suitable for use in the preparation of the hydroxyl polyethers are thiodiglycol, 3,3'-dihydroxypropyl sulfide, 4,4'-dihydroxybutyl sulfide and mixed aromatic-aliphatic thioether glycols, such as 1,4-(β-hydroxyethyl)-phenylene dithioether, and also analogous compounds of the naphthalene- and diphenylmethane series.

An advantageous mode of preparing the polyethers involves heating to a temperature of 150°–200° C. a substantially equimolecular mixture of polyhydric alcohol and thioether glycol with the addition of a small amount, preferably 0.1 to 0.5% by weight, based on the weight of the mixture, of a sulfonic acid ester. Water is split off at this temperature, this being completed in about 3 to 6 hours, depending upon the amount of catalyst. By applying a vacuum at the end of the reaction, the last residues of the water of reaction are split off and the polycondensation is completed. For the purpose of the invention polyethers having an hydroxyl number of about 150 to 300 are preferred.

As unsaturated compounds containing groups capable of reacting with hydroxyl groups, there may be mentioned maleic anhydride, maleic polyester, 2-isocyanato ethylacrylate, ethylene glycol diacrylate and triacrylyl hexahydrotriazine. The reaction of these unsaturated compounds containing groups capable of reacting with hydroxyl groups with the above polyethers containing terminal hydroxyl groups is effected either in the melt or in solution. The reactants or the solution, respectively, is heated to a temperature of about 75° to 135° C. for about 30 to 60 minutes. When employing a solvent in this reaction, it is preferred to use one which, due to its structure, is capable of participating in the copolymerization at the final stage. Such diluents are, for instance, styrene and phthalic acid diallyl ester. The diluents may be employed in an amount of about 10 to 60% calculated on the amount of the other two reactants. In some instances, such as in the reaction with triacrylyl hexahydrotriazine, it is advantageous to employ catalysts, such as metal alcoholates. The reaction of the hydroxyl compounds with the unsaturated compounds containing reactive groups capable of reacting with hydroxyl groups is further described in German Patent 910,124.

Suitable ethylenically unsaturated compounds which may be copolymerized with the unsaturated polyethers thus produced include, inter alia, styrene, acrylic esters, methacrylic esters and allyl esters of organic acids, such as diallyl phthalate.

The copolymerization can be performed in the cold or in the heat. If copolymerization proceeds in the heat, it is preferably initiated by catalysts, particularly suitable catalysts being the known radical formers of the azo series, such as azoisobutyronitrile, azodicyclohexyl-1,1'-dinitrile etc. If, however, copolymerization is effected in the cold, redox catalysts are to be used, for instance benzoyl peroxide with p-methyl-N-dimethyl-aniline or permaleic acid with the morpholine salt of p-toluenesulfonic acid. After polymerization has finished the polymerisates can be tempered for two hours at 120° C. in order to obtain the maximum of strength.

The copolymers of the invention exhibit outstanding resistance to hydrolytic degradation and may be used as valuable substitutes for polyester resins in the plastics industry.

The following examples, in which the parts indicated are by weight, further illustate the invention without in any way limiting it.

*Example 1*

A mixture consisting of 732 parts of thiodiglycol, 540 parts of 1,4-butanediol, 502 parts of trimethylol propane and 3 parts of p-toluene sulfonic acid methyl ester is heated at 160° to 170° C. under normal pressure until the major part of the water being formed in the etherification is distilled off. Then a vacuum is applied and heating is continued until an hydroxyl number of 270 is reached. Finally, the hydroxyl polyether obtained is treated with super-heated steam at 150° C. to remove traces of acid contained therein.

700 parts of this hydroxyl polyether are reacted with 330 parts of maleic anhydride at a temperature of 125° to 130° C. for 1 hour. During the first stage of this reaction, the reactive mixture is cooled to prevent the temperature from rising above 125° C. Thereupon, 0.45 part of hydroquinone and 442 parts of styrene are added at 120° C. To carry out the copolymerization, 100 parts of the mixture are heated with 0.3 part of azoisobutyricnitrile to 100° C. After a few minutes, the copolymerization sets in and a clear, almost colorless, and infusible resin, as hard as glass, is obtained.

*Example 2*

Following the procedure indicated in Example 1, an hydroxyl polyether is prepared from 854 parts of thiodiglycol, 360 parts of 1,4-butanediol, 586 parts of trimethylol propane, 948 parts of diphenyl-dimethyl methane bis-hydroxyethyl ether and 5 parts of p-toluene sulfonic acid methyl ester, the hydroxyl number of the hydroxyl polyether being 223. 1,400 parts of this hydroxyl polyether are mixed at 120° C. with 540 parts of maleic acid anhydride. The mixture is stirred for 1 hour at 125° to 130° C., initially with cooling. Then 0.8 part of hydroquinone, 500 parts of styrene and 330 parts of phthalic acid diallyl ester are added. 100 parts of the mixture thus obtained are mixed with 0.5 part of dicyclohexylazodinitrile and heated to 100° C. whereby copolymerization is effected. The copolymer obtained is very hard and absolutely insoluble.

*Example 3*

Following the procedure indicated in Example 1, an hydroxyl polyether having the hydroxyl number 220 is produced from 854 parts of thiodiglycol, 586 parts of trimethylol propane, 2,212 parts of diphenyl-dimethyl methane bis-hydroxyethyl ether and 5 parts of p-toluene sulfonic acid methyl ester. 555 parts of 2-isocyanato ethyl-acrylate and 1.5 parts of quinhydrone are slowly added to 1000 parts of the above hydroxyl polyether at a temperature of 120° C. Upon stirring for 1 hour at 120° C., 665 parts of styrene are added with stirring. 100 parts of the mixture thus prepared are mixed with 0.3 part of azoisobutyricnitrile and copolymerized at 100° C. The copolymer obtained is clear as glass and completely insoluble.

While certain representative embodiments and details have been shown for the purpose of illustrating this invention, it will be apparent to those skilled in the art that various changes and modifications may be made therein without departing from the spirit and scope of the invention.

What is claimed is:

1. The copolymer prepared by the process which comprises reacting maleic anhydride with a polythioether having an hydroxyl number of about 150 to about 300 and prepared by the process which comprises reacting a polyhydric alcohol with a thioether glycol, and thereafter copolymerizing the reaction product obtained with a compound containing the radical $$CH_2=\overset{X}{C}-$$

wherein X is selected from the group consisting of hydrogen and methyl.

2. A process for producing a copolymer which comprises reacting maleic anhydride with a polythioether having an hydroxyl number of about 150 to about 300 and prepared by the process which comprises reacting a polyhydric alcohol with a thioether glycol, and thereafter copolymerizing the reaction product obtained with a compound containing the radical $$CH_2=\overset{X}{C}-$$

wherein X is selected from the group consisting of hydrogen and methyl.

3. A copolymer prepared by the process which comprises reacting maleic anhydride with a polythioether having an hydroxyl number of from about 150 to about 300 and prepared by a process which comprises reacting thiodiglycol, 1,4-butanediol and trimethylol propane and subsequently copolymerizing the unsaturated polythioether thus produced with styrene.

4. A copolymer prepared by the process which comprises reacting maleic anhydride with a polythioether having an hydroxyl number of from about 150 to about 300 and prepared by the process which comprises reacting thiodiglycol, 1,4-butanediol and diphenyl dimethyl methane-bis-hydroxylethyl ether and subsequently copolymerizing the unsaturated polythioether thus produced with styrene and diallylphthalate.

References Cited in the file of this patent

UNITED STATES PATENTS

| | | |
|---|---|---|
| 2,255,313 | Ellis | Sept. 9, 1941 |
| 2,332,898 | D'Alelio | Oct. 26, 1943 |
| 2,453,666 | Kropa | Nov. 9, 1948 |
| 2,777,829 | Andrews et al. | Jan. 15, 1957 |
| 2,900,368 | Stilmar | Feb. 9, 1960 |